United States Patent
Massari et al.

(10) Patent No.: US 11,407,867 B2
(45) Date of Patent: Aug. 9, 2022

(54) HEAT-SHRINKABLE LABEL

(71) Applicant: BASELL POLIOLEFINE ITALIA S.R.L., Milan (IT)

(72) Inventors: Paola Massari, Ferrara (IT); Andrea Felisati, Ferrara (IT); Marco Izzi, Frankfurt (DE); Paolo Bassi, Ferrara (IT); Claudio Cavalieri, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 327 days.

(21) Appl. No.: 16/758,763

(22) PCT Filed: Oct. 31, 2018

(86) PCT No.: PCT/EP2018/079794
§ 371 (c)(1),
(2) Date: Apr. 23, 2020

(87) PCT Pub. No.: WO2019/091841
PCT Pub. Date: May 16, 2019

(65) Prior Publication Data
US 2020/0255609 A1    Aug. 13, 2020

(30) Foreign Application Priority Data

Nov. 9, 2017 (EP) .................................... 17200780

(51) Int. Cl.
| | | |
|---|---|---|
| C08F 210/14 | (2006.01) | |
| B65B 53/02 | (2006.01) | |
| C08J 5/18 | (2006.01) | |
| C08F 210/16 | (2006.01) | |
| B29C 61/02 | (2006.01) | |
| B29C 65/00 | (2006.01) | |

(52) U.S. Cl.
CPC ................ *C08J 5/18* (2013.01); *B29C 61/02* (2013.01); *B29C 66/73715* (2013.01); *B65B 53/02* (2013.01); *C08F 210/14* (2013.01); *C08F 210/16* (2013.01); *C08J 2323/16* (2013.01)

(58) Field of Classification Search
None
See application file for complete search history.

(56) References Cited

U.S. PATENT DOCUMENTS

| | | | |
|---|---|---|---|
| 9,006,368 B2 * | 4/2015 | Marzolla | C08F 210/06 526/348 |
| 2014/0332109 A1 * | 11/2014 | Cavalieri | B32B 27/32 138/140 |
| 2016/0193815 A1 * | 7/2016 | Mitchell | G09F 3/06 428/220 |

FOREIGN PATENT DOCUMENTS

| | | |
|---|---|---|
| EP | 0374783 A2 | 6/1990 |
| EP | 2602102 A1 | 6/2013 |
| JP | S57129746 A | 8/1982 |
| WO | 2013030314 A1 | 3/2013 |
| WO | 2016102779 A1 | 6/2016 |

OTHER PUBLICATIONS

International Search Report and Written Opinion dated Feb. 13, 2019 (dated Feb. 13, 2019) for Corresponding PCT/EP2018/079794.

* cited by examiner

Primary Examiner — Richard A Huhn

(57) ABSTRACT

A heat-shrinkable label made from or containing a terpolymer film containing propylene, ethylene and 1-hexene, wherein the terpolymer has:
  (i) a content of ethylene derived units ranging from 0.5 wt % to 5.0 wt %,
  (ii) a content of 1-hexene derived units ranging from 1.0 wt % to 6.0 wt %,
  (iii) a melt flow rate (MFR) (ISO 1133 230° C., 2.16 kg) ranging from 0.5 to 20 g/10 min, and
  (iv) a polydispersity index (P.I.) ranging from 2.0 to 7.0.

10 Claims, No Drawings

HEAT-SHRINKABLE LABEL

This application is the U.S. National Phase of PCT International Application PCT/EP2018/079794, filed Oct. 31, 2018, claiming benefit of priority to European Patent Application No. 17200780.9, filed Nov. 9, 2017, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to a heat-shrinkable label.

BACKGROUND OF THE INVENTION

In some instances, propylene/ethylene/1-hexene terpolymers are used in the production of films.

Heat-shrinkable films shrink or contract when exposed to elevated temperatures. This characteristic of heat-shrinkable films allows the films to enclose or shrink around a product, thereby producing a close film wrapping that conforms to the contours of the product.

SUMMARY OF THE INVENTION

In a general embodiment, the present disclosure provides a heat-shrinkable label made from or containing a terpolymer film containing propylene, ethylene and 1-hexene, wherein the terpolymer has:

(i) a content of ethylene derived units ranging from 0.5 wt % to 5.0 wt %,
(ii) a content of 1-hexene derived units ranging from 1.0 wt % to 6.0 wt,
(iii) a melt flow rate (MFR) (ISO 1133 230° C., 2.16 kg) ranging from 0.5 to 20 g/10 min, and
(iv) a polydispersity index (P.I.) ranging from 2.0 to 7.0.

DETAILED DESCRIPTION OF THE INVENTION

As used herein, the term "shrinkable layer" includes shrink sleeve labels and roll-fed shrink labels.

The terpolymer contains propylene, ethylene and 1-hexene, the sum of these three comonomers derived units content being 100.

In some embodiments, the film is a cast film.

In some embodiments, the film is a monolayer polymer film. In some embodiments, the film is a multilayer polymer film.

In some embodiments, the molecular weight of the terpolymer is modified by visbreaking.

In some embodiments, the content of ethylene derived units ranges from 1.0 wt % to 3.0 wt %; alternatively from 1.2 wt % to 2.5 wt %.

In some embodiments, the content of 1-hexene derived units ranges from 2.0 wt % to 5.0 wt %; alternatively from 2.5 wt % to 4.0 wt %.

In some embodiments, the melt flow rate ranges from 1 to 10 g/10 min, alternatively from 3 to 8 g/10 min.

In some embodiments, the polydispersity index (P.I.) ranges from 3.0 to 6.5, alternatively from 3.5 to 6.0.

In some embodiments, the area of the DSC curve after the peak of the melting point (Tm) represents more than 22%; alternatively more than 25%, alternatively more than 28%, of the total area of the DSC curve.

As used herein, the melting temperature (melting point, Tm), crystallization temperature (Tc) and partial area percentage are determined by differential scanning calorimetry (DSC) by using the following method:

A sample weighing 6±1 mg, is heated to 220±1° C. at a rate of 20° C./min and kept at 220±1° C. for 2 minutes in nitrogen stream. Thereafter, the sample is cooled at a rate of 20° C./min to 40±2° C. The sample is kept at 40±2° C. for 2 min, allowing the sample to crystallize. Then, the sample is again fused at a temperature rise rate of 20° C./min up to 220° C.±1. The melting scan is recorded. A thermogram is obtained. The melting temperatures and crystallization temperatures are read. For partial area calculation, the melting peak considered for Tm calculation is used. A baseline to the peak is built by joining the peak initiation and end temperatures at which the endothermic peak begins and ends to deviate from the baseline. Partial area is calculated with the Tm temperature as the starting point and the peak end temperature as the end point. Results are expressed as a percentage of total area.

In some embodiments, the terpolymer of the present disclosure has:

(v) the area of the DSC curve between the peak of the melting point and Tm+5° C. is lower than 19%; alternatively lower than 15%; alternatively lower than 13% of the total area of the DSC curve.

In some embodiments, the amount (wt %) of 1-hexene (C6), the amount (wt %) of ethylene (C2) and the melting point (Tm) of the terpolymer fulfill the following relation (I)

$$Tm > 157 - (C2 + 0.8C6) * 6 \qquad (I)$$

In some embodiments, relation (I) is $Tm > 158 - (C2 + 0.8C6) * 6$; alternatively $Tm > 159 - (C2 + 0.8C6) * 6$;

In some embodiments, the terpolymer has a seal initiation temperature (SIT) between 90° C. and 120° C., alternatively between 100° C. and 115° C.; alternatively between 102° C. and 113° C.

In some embodiments, the crystallization temperature ranges from 70° C. to 100° C., alternatively from 80° C. to 95° C.; alternatively from 85° C. to 95° C.

In some embodiments, the MFR of the terpolymer is achieved by visbreaking a polymer having a lower MFR. In some embodiments, the visbreaking agent is a peroxide. In some embodiments, visbreaking is used to fine tune the MFR of the product.

The terpolymers of the present disclosure have a xylene extractables content lower than 15 wt %.

Without to be bound by a theory, it is believed that the larger area of the DSC curve after the melting point peak indicates the presence of high melting point terpolymer fractions. In some embodiments, the polymerization process subsequently described yields a multimodal terpolymer. As used herein, the term "multimodal terpolymer" refers to a terpolymer containing a fraction having a low content of comonomers, wherein the low-content fraction causes the high melting point, and containing a fraction having a quite high comonomer content, wherein the high-content fraction causes the low SIT. In some embodiments, at high comonomers content, the terpolymers of the present disclosure show a high melting point.

The high melting point fractions facilitate processing of the terpolymer. In some embodiments, the high melting point fractions are useful in the production of films. At the same time, the low SIT facilitates use of the terpolymer in various materials such as multilayer films.

In some embodiments, the terpolymer is prepared by polymerization in one or more polymerization steps. In some embodiments, polymerization is carried out in the presence of Ziegler-Natta catalysts. The catalysts contain a solid catalyst component made from or containing a titanium compound having at least one titanium-halogen bond, and an electron-donor compound, both supported on a magnesium halide in active form. The catalyst system also contains an organoaluminum compound as a cocatalyst. In some embodiments, the organoaluminum compound is an aluminum alkyl compound.

An external donor is optionally added.

In some embodiment, the catalysts produce polypropylene with a value of xylene insolubility at ambient temperature greater than 90%, alternatively greater than 95%.

In some embodiments, the catalysts are as described in U.S. Pat. No. 4,399,054 or European Patent No. 45977. In some embodiments, the catalysts are as described in U.S. Pat. No. 4,472,524.

In some embodiments, the solid catalyst components are made from or containing, as electron-donors (internal donors), compounds selected from the group consisting of ethers, ketones, lactones, compounds containing N, P and/or S atoms, and esters of mono- and dicarboxylic acids.

In some embodiments, the electron-donor compounds are esters of phthalic acid and 1,3-diethers of formula:

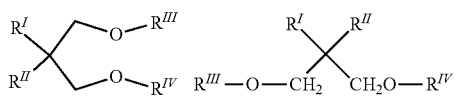

wherein $R^I$ and $R^{II}$ are the same or different and are $C_1$-$C_{18}$ alkyl, $C_3$-$C_{18}$ cycloalkyl or $C_7$-$C_{18}$ aryl radicals; $R^{III}$ and $R^{IV}$ are the same or different and are $C_1$-$C_4$ alkyl radicals; or are the 1,3-diethers wherein the carbon atom in position 2 belongs to a cyclic or polycyclic structure made up of 5, 6, or 7 carbon atoms, or of 5-n or 6-n' carbon atoms, and respectively n nitrogen atoms and n' heteroatoms selected from the group consisting of N, O, S and Si, where n is 1 or 2 and n' is 1, 2, or 3, the structure containing two or three unsaturations (cyclopolyenic structure), and optionally being condensed with other cyclic structures, or substituted with one or more substituents selected from the group consisting of linear or branched alkyl radicals; cycloalkyl, aryl, aralkyl, alkaryl radicals and halogens, or being condensed with other cyclic structures and substituted with one or more of the above-mentioned substituents; one or more of the above-mentioned alkyl, cycloalkyl, aryl, aralkyl, or alkaryl radicals and the condensed cyclic structures optionally containing one or more heteroatom(s) as substitutes for carbon or hydrogen atoms, or both. In some embodiments, the substituents are bonded to the condensed cyclic structures.

In some embodiments, the ethers are as described in published European Patent Application Nos. 361493 and 728769.

In some embodiments, the diethers are selected from the group consisting of 2-methyl-2-isopropyl-1,3-dimethoxypropane, 2,2-diisobutyl-1,3-dimethoxypropane, 2-isopropyl-2-cyclopentyl-1,3-dimethoxypropane, 2-isopropyl-2-isoamyl-1,3-dimethoxypropane, and 9,9-bis(methoxymethyl) fluorene.

In some embodiments, the electron-donor compounds are phthalic acid esters. In some embodiments, the phthalic acid esters are selected from the group consisting of diisobutyl, dioctyl, diphenyl and benzylbutyl phthalate.

In some embodiments, a $MgCl_2 \cdot nROH$ adduct wherein n is from 1 to 3 and ROH is ethanol, butanol or isobutanol, is reacted with an excess of $TiCl_4$ containing the electron-donor compound. In some embodiments, the $MgCl_2 \cdot nROH$ adduct is in the form of spheroidal particles. In some embodiments, the reaction temperature is from 80 to 120° C. The solid is then isolated and reacted once more with $TiCl_4$, in the presence or absence of the electron-donor compound, after which the solid is separated and washed with aliquots of a hydrocarbon until the chlorine ions are removed.

In some embodiments and in the solid catalyst component, the titanium compound, expressed as Ti, is present in an amount from 0.5 to 10% by weight. In some embodiments, the quantity of electron-donor compound which remains fixed on the solid catalyst component is 5 to 20% by moles with respect to the magnesium dihalide.

In some embodiments, the titanium compounds used to prepare the solid catalyst component are halides or halogen alcoholates of titanium. In some embodiments, the titanium compound is titanium tetrachloride.

The above-described reactions yield a magnesium halide in active form. In some embodiments, magnesium halide in active form is yielded from reactions starting with other magnesium compounds. In some embodiments, the other magnesium compounds are magnesium carboxylates.

The Al-alkyl compounds used as co-catalysts are made from or containing Al-trialkyls or linear or cyclic Al-alkyl compounds containing two or more Al atoms bonded by O or N atoms, or $SO_4$ or $SO_3$ groups. In some embodiments, the Al-trialkyls are selected from the group consisting of Al-triethyl, Al-triisobutyl, and Al-tri-n-butyl.

In some embodiments, the amount of Al-alkyl compound is such that the Al/Ti ratio is from 1 to 1000.

In some embodiments, the electron-donor compounds used as external donors include aromatic acid esters such as alkyl benzoates. In some embodiments, the electron-donor compounds used as external donors include silicon compounds containing at least one Si—OR bond, where R is a hydrocarbon radical.

In some embodiments, the silicon compounds are selected from the group consisting of (tert-butyl)$_2$Si(OCH$_3$)$_2$, (cyclohexyl)(methyl)Si (OCH$_3$)$_2$, (cyclopentyl)$_2$Si(OCH$_3$)$_2$, (phenyl)$_2$Si(OCH$_3$)$_2$, and (1,1,2-trimethylpropyl)Si(OCH$_3$)$_3$.

In some embodiments, the electron-donor compounds are 1,3-diethers having the formula described above. In some embodiments, the internal donor is a 1,3-diether while external donors are omitted.

In some embodiments, the terpolymers are prepared by using catalysts containing a phthalate as internal donor and (cyclopentyl)$_2$Si(OCH$_3$)$_2$ as external donor, or the 1,3-diethers as internal donors.

In some embodiments, the propylene-ethylene-hexene-1 polymers are produced with a polymerization process as described in European Patent Application No. 1 012 195.

In some embodiments, the process includes the steps of feeding the monomers to the polymerization zones in the presence of catalyst under reaction conditions and collecting the polymer product from the polymerization zones. In the process the growing polymer particles flow upward through a first polymerization zone (riser) under fast fluidization conditions, leave the riser and enter a second polymerization zone (downcomer) through which the polymer particles flow downward in a densified form under the action of gravity, leave the downcomer and are reintroduced into the riser, thereby establishing a circulation of polymer between the riser and the downcomer.

In the downcomer high values of density of the solid are reached, which approach the bulk density of the polymer. In some embodiments, a positive gain in pressure is obtained along the direction of flow, thereby facilitating reintroduction of the polymer into the riser. A "loop" circulation is established and defined by the balance of pressures between the two polymerization zones and the head loss introduced into the system.

In some embodiments, the condition of fast fluidization in the riser is established by feeding a gas mixture made from or containing the monomers to the riser. In some embodiments, the feeding of the gas mixture is effected below the point of reintroduction of the polymer into the riser by a gas distributor. The velocity of transport gas into the riser is higher than the transport velocity under the operating conditions. In some embodiments, the velocity of transport gas is from 2 to 15 m/s.

In some embodiments, the polymer and the gaseous mixture leaving the riser are conveyed to a solid/gas separation zone. From the separation zone, the polymer enters the downcomer. The gaseous mixture leaving the separation zone is compressed, cooled and transferred to the riser. In some embodiments, the gaseous mixture includes additional make-up monomers or molecular weight regulators. In some embodiments, the transfer is effected by a recycle line for the gaseous mixture.

In some embodiments, the control of the polymer circulating between the two polymerization zones is effected by metering the amount of polymer leaving the downcomer. In some embodiments, the metering is controlled by mechanical valves.

In some embodiments, the operating temperature is between 50 to 120° C. In some embodiments, the first stage process is carried out under operating pressures of between 0.5 and 10 MPa, alternatively between 1.5 to 6 MPa.

In some embodiments, quantities of one or more inert gases are maintained in the polymerization zones such the sum of the partial pressure of the inert gases is between 5 and 80% of the total pressure of the gases. In some embodiments, the inert gas is nitrogen or propane.

The various catalysts are fed up to the riser at any point of the riser. In some embodiments, the catalysts are fed at any point of the downcomer. In some embodiments, the catalyst is in any physical state. In some embodiments, the catalysts is in solid or liquid state.

In some embodiments, the terpolymer is blended with additives. In some embodiments, the additives are selected from the group consisting of antioxidants, light stabilizers, heat stabilizers, nucleating agents, colorants and fillers.

In some embodiments, a process for labelling an item is provided. In some embodiments, the process for labelling an item includes the step of applying a heat-shrinkable label to an item. The following examples are given to illustrate the present disclosure without limiting purpose.

EXAMPLES

Characterization Methods
Melting Temperature, Crystallization Temperature and Partial Area Percentage Determination:

Determined by differential scanning calorimetry (DSC). A sample weighing 6±1 mg, was heated to 220±1° C. at a rate of 20° C./min and kept at 220±1° C. for 2 minutes in nitrogen stream. The sample was thereafter cooled at a rate of 20° C./min to 40±2° C., thereby kept at this temperature for 2 min to crystallize the sample. Then, the sample was again fused at a temperature rise rate of 20° C./min up to 220° C.±1. The melting scan was recorded. A thermogram was obtained. The melting temperatures and crystallization temperatures were read.

For partial area calculation, the melting peak considered for Tm calculation was used.

A baseline to the peak was built by joining the peak initiation and end temperatures at which the endothermic peak begins and ends to deviate from the baseline.

Partial area was calculated by taking the Tm temperature as starting point and the peak end temperature as end point. Results are expressed in percentage of total area.

Melt Flow Rate: Determined according to the method ISO 1133 (230° C., 2.16 kg).

Solubility in xylene: Determined as follows.

2.5 g of polymer and 250 ml of xylene were introduced into a glass flask equipped with a refrigerator and a magnetic stirrer. The temperature was raised in 30 minutes to 135° C. The obtained clear solution was then kept under reflux and stirring for further 30 minutes. The closed flask was kept in thermostatic water bath at 25° C. for 30 minutes. The formed solid was filtered on quick filtering paper. 100 ml of the filtered liquid was poured in a pre-weighed aluminum container, which was heated on a heating plate under nitrogen flow, to remove the solvent by evaporation. The container was then kept in an oven at 70° C. under vacuum until constant weight was obtained. The weight percentage of polymer soluble in xylene at room temperature was then calculated.

1-hexene and ethylene content: Determined by $^{13}$C-NMR spectroscopy in terpolymers:

$^{13}$C NMR spectra were acquired on an AV-600 spectrometer operating at 150.91 MHz in the Fourier transform mode at 120° C. The peak of the propylene CH was used as an internal reference at 28.83. The $^{13}$C NMR spectrum was acquired using the following parameters:

| | |
|---|---|
| Spectral width (SW) | 60 ppm |
| Spectrum center (O1) | 30 ppm |
| Decoupling sequence | WALTZ 65_64pl |
| Pulse program [1] | ZGPG |
| Pulse Length (P1) [2] | for 90° |
| Total number of points (TD) | 32K |
| Relaxation Delay [2] | 15 s |
| Number of transients [3] | 1500 |

The total amount of 1-hexene and ethylene as molar percent was calculated from diad using the following relations:

[P]=PP+0.5PH+0.5PE

[H]=HH+0.5PH

[E]=EE+0.5PE

Assignments of the $^{13}$C NMR spectrum of propylene/1-hexene/ethylene copolymers have been calculated according to the following table:

| Area | Chemical Shift | Assignments | Sequence |
|---|---|---|---|
| 1 | 46.93-46.00 | $S_{\alpha\alpha}$ | PP |
| 2 | 44.50-43.82 | $S_{\alpha\alpha}$ | PH |
| 3 | 41.34-4.23 | $S_{\alpha\alpha}$ | HH |
| 4 | 38.00-37.40 | $S_{\alpha\gamma} + S_{\alpha\delta}$ | PE |

-continued

| Area | Chemical Shift | Assignments | Sequence |
|---|---|---|---|
| 5 | 35.70-35.0 | $4B_4$ | H |
| 6 | 35.00-34.53 | $S_{\alpha\gamma} + S_{\alpha\delta}$ | HE |
| 7 | 33.75 33.20 | CH | H |
| 8 | 33.24 | $T_{\delta\delta}$ | EPE |
| 9 | 30.92 | $T_{\beta\delta}$ | PPE |
| 10 | 30.76 | $S_{\gamma\gamma}$ | XEEX |
| 11 | 30.35 | $S_{\gamma\delta}$ | XEEE |
| 12 | 29.95 | $S_{\delta\delta}$ | EEE |
| 13 | 29.35 | $3B_4$ | H |
| 14 | 28.94-28.38 | CH | P |
| 15 | 27.43-27.27 | $S_{\beta\delta}$ | XEE |
| 16 | 24.67-24.53 | $S_{\beta\beta}$ | XEX |
| 17 | 23.44-23.35 | $2B_4$ | H |
| 18 | 21.80-19.90 | $CH_3$ | P |
| 19 | 14.22 | $CH_3$ | H |

Polydispersity Index (P.I.):

Determined at a temperature of 200° C. by using a parallel plates rheometer model RMS-800 marketed by RHEOMETRICS (USA), operating at an oscillation frequency which was increased from 0.1 rad/sec to 100 rad/sec. The P.I. was derived from the equation:

$$P.I.=105/Gc$$

wherein Gc is the crossover modulus which was defined as the value (expressed in Pa) at which G'=G" wherein G' is the storage modulus and G" is the loss modulus.

Seal Initiation Temperature (SIT)

Preparation of the film specimens

Some films with a thickness of 50 μm were prepared by extruding each test composition in a single screw Collin extruder (length/diameter ratio of screw 1:25) at a film drawing speed of 7 m/min and a melt temperature of 210-250° C. Each resulting film was superimposed on a 1000 μm thick film of a propylene homopolymer having a xylene insoluble fraction of 97 wt % and an MFR L of 2 g/10 min. The superimposed films were bonded to each other in a Carver press at 200° C. under a 9000 kg load, which was maintained for 5 minutes. The resulting laminates were stretched longitudinally and transversally, that is, biaxially, by a factor of 6 with a TOM Long film stretcher at 150° C., thereby obtaining a 20 μm thick film (18 μm homopolymer+2 μm test). 2×5 cm specimens were cut from the films.

Determination of the SIT

For each test two specimens were superimposed in alignment, the adjacent layers being layers of the test composition. The superimposed specimens were sealed along one of the 2 cm sides with a Brugger Feinmechanik Sealer, model HSG-ETK 745. Sealing time was 5 seconds at a pressure of 0.1 N/mm². The sealing temperature was increased 2° C. for each seal, starting from about 10° C. less than the melting temperature of the test composition. The sealed samples were left to cool and then the unsealed ends were attached to an Instron machine where the sample specimens were tested at a traction speed of 50 mm/min.

The SIT was the minimum sealing temperature at which the seal does not break when a load of at least 2 Newtons was applied.

Shrinkage

Preparation of the film specimens

Films with a thickness of 200 μm were prepared by extruding the test composition in a single screw Leonard extruder (length/diameter ratio of screw 1:27) at a film drawing speed of 4 m/min and a melt temperature of 230-250° C.

Stretching of the films

The films were stretched in MD with Karo 4 Brueckner stretching line (stretching ratio 5:1) at speed 600% sec after preheating time of 30 sec at temperature 115° C.

Shrinkage measurement

Label shrinkage was determined by placing 100×20 mm label sample in an oven with circulating air. Each label sample was carved out from the film.

Oven residence time was 180 s (+/−5 s) at different air temperature (100 or 110° C.). Calculation of the final film shrinkage was determined with the equation:

$$\text{Film shrinkage}=(Li-Lf)/Li*100$$

wherein

Li=initial film dimension (100 mm)

Lf=film dimension after the oven treatment

Measurements were done when film reached the room temperature (15-20 m after being extracted from the oven).

Example 1

A terpolymer was prepared by polymerizing propylene, ethylene and hexene-1 in the presence of a catalyst under continuous conditions in a plant having a polymerization apparatus as described in European Patent No. EP 1 012 195.

The polymerization apparatus had two interconnected cylindrical reactors, riser and downcomer. Fast fluidization conditions were established in the riser by recycling gas from the gas-solid separator.

In Example 1 the gas composition in the two reactor legs was differentiated by using a "barrier" feed as described in European Patent No. EP 1 012 195. A barrier stream of propylene was fed in the larger upper part of the downcomer. In comparative example 2, the barrier feed was not been used.

The catalyst was made from or containing a catalyst component prepared as described with example 5 of European Patent Application No. EP-A-728 769, using microspheroidal $MgCl_2.1.7C_2H_5OH$ instead of $MgCl_2.2.1C_2H_5OH$. The catalyst component was used with dicyclopentyl dimethoxy silane (DCPMS) as external donor and with triethylaluminium (TEA).

The polymer particles exiting the reactor were subjected to a steam treatment to remove the reactive monomers and volatile substances and then dried. The main operative conditions are indicated in Table 1.

TABLE 1

| Examples | | 1 |
|---|---|---|
| TEA/solid catalyst component, g/g | | 10 |
| TEA/DCPMS, g/g | | 4 |
| C6/(C3 + C6), mol/mol | Riser | 0.039 |
| C6/(C3 + C6), mol/mol | Downcomer | 0.084 |
| C2/(C3 + C2), mol/mol | Riser | 0.02 |
| C2/(C3 + C2), mol/mol | Downcomer | 0.006 |

C2: ethylene;
C3: propylene;
C6: 1-hexene

Comparative Example 2

Comparative Example 2 was a propylene-ethylene-1-butene terpolymer prepared as described for Example 1 in Patent Cooperation Treaty Publication No. WO 2009/

019169. The ethylene derived units content was 3.7 wt %, while the 1-butene derived units content was 6.4 wt % with respect to the terpolymer.

To the terpolymers obtained according to Example 1 and Comparative Example 2 the following additives were added (Table 2).

TABLE 2

|  |  | Example 1 | Comparative Example 2 |
|---|---|---|---|
| Terpolymer | wt % | 99.68 | 99.70 |
| Silica | wt % | 0.10 | 0.10 |
| Antioxidants | wt % | 0.15 | 0.15 |
| Calcium stearate | wt % | 0.05 | 0.05 |
| Luperox 101 | Wt % | 0.02 | no |

In Table 3 the properties of Example 1 and Comparative Example 2 are reported.

TABLE 3

| Example |  | Example 1 | Comparative Example 2 |
|---|---|---|---|
| MFR | g/10 min | 6.2 | 5.5 |
| C6 NMR | % | 3.4 | 0 |
| C2 NMR | % | 1.9 | 3.7 |
| C4 NMR | % | 0 | 6.4 |
| P.I. |  | 4.2 |  |
| XS | % | 12 |  |
| Tm | ° C. | 134.5 | 131.7 |
| Tc | ° C. | 88.3 | 79.3 |
| Label shrinkage at 100° C. | % | 8 | 5 |
| Label shrinkage at 100° C. | % | 13 | 11 |
| Area of the DSC after the melting point (Tm) | % | 28 | 31.5 |
| Area of the DSC between the melting point (Tm) and Tm + 5° C. | % | 12 | 9.5 |
| SIT | ° C. | 105 | 105 |

C2: ethylene;
C6: 1-hexene;
C4: 1-butene;
XS: xylene solubles

What is claimed is:

1. A heat-shrinkable label comprising:
a film comprising
a terpolymer containing propylene, ethylene and 1-hexene, wherein the terpolymer has:
a content of ethylene derived units ranging from 0.5 wt % to 5.0 wt %,
(ii) a content of 1-hexene derived units ranging from 1.0 wt % to 6.0 wt %,
(iii) a melt flow rate (MFR) (ISO 1133 230° C., 2.16 kg) ranging from 0.5 to 20 g/10 min, and
(iv) a polydispersity index (P.I.) ranging from 2.0 to 7.0.

2. The heat-shrinkable label according to claim 1, wherein the area of the DSC curve of the terpolymer after the peak of the melting point (Tm) represents more than 22% of the total area of the DSC curve.

3. The heat-shrinkable label according to claim 1, wherein the area of the DSC curve between the peak of the melting point (Tm) and Tm+5° C. is lower than 19% of the total area of the DSC curve.

4. The heat-shrinkable label according to claim 1, wherein the amount (wt %) of 1-hexene (C6), the amount (wt %) of ethylene (C2) and the melting point (Tm) of the terpolymer fulfill the following relation (I)

$$Tm > 157 - (C2 + 0.8C6) * 6 \qquad (I).$$

5. The heat-shrinkable label according to claim 1, wherein the content of ethylene derived units of the terpolymer ranges from 1.0 wt % to 3.0 wt %.

6. The heat-shrinkable label according to claim 1, wherein the content of 1-hexene derived units of the terpolymer ranges from 2.0 wt % to 5.0 wt %.

7. The heat-shrinkable label according to claim 1, wherein the melt flow rate (MFR) (ISO 1133 230° C., 2.16 kg) of the terpolymer ranges from 1 to 10 g/10 min.

8. The heat-shrinkable label according to claim 1, wherein the polydispersity index (P.I.) of the terpolymer ranges from 3.0 to 6.5.

9. The heat-shrinkable label according to claim 1, wherein the xylene extractables of the terpolymer are lower than 15 wt %.

10. A process for labelling an item comprising the step of: applying a heat-shrinkable label according to claim 1 to an item.

* * * * *